Jan. 31, 1967 D. CAUGHLIN 3,301,077
VARIABLE SPEED TRANSMISSION UNIT
Filed March 16, 1964 3 Sheets-Sheet 1

Dan Caughlin
INVENTOR.

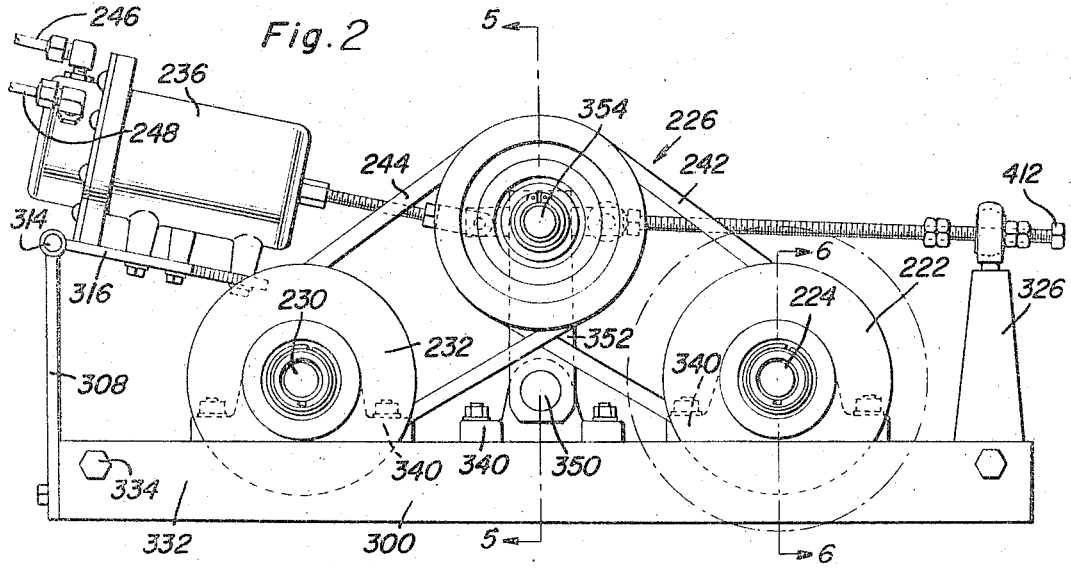
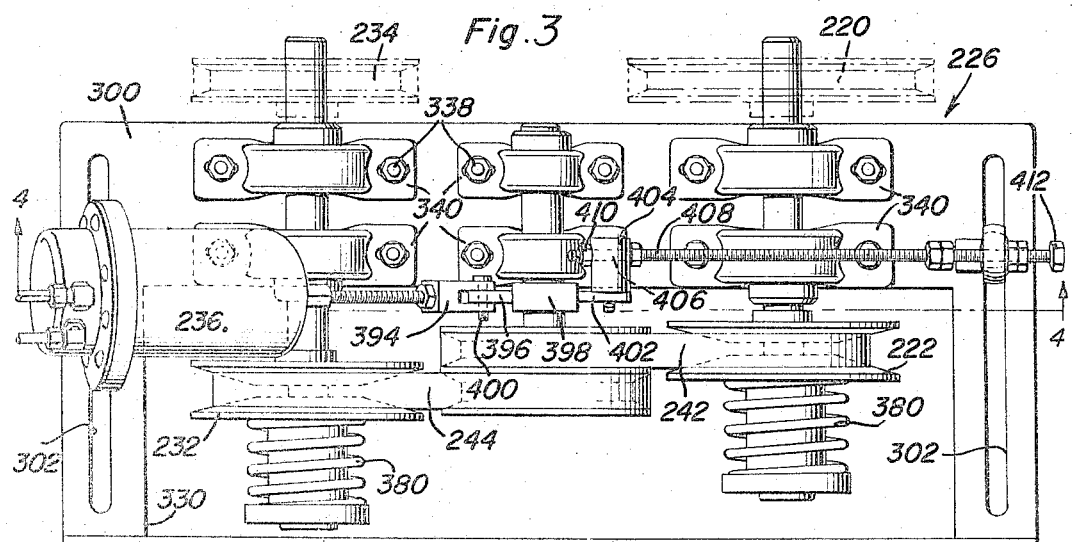
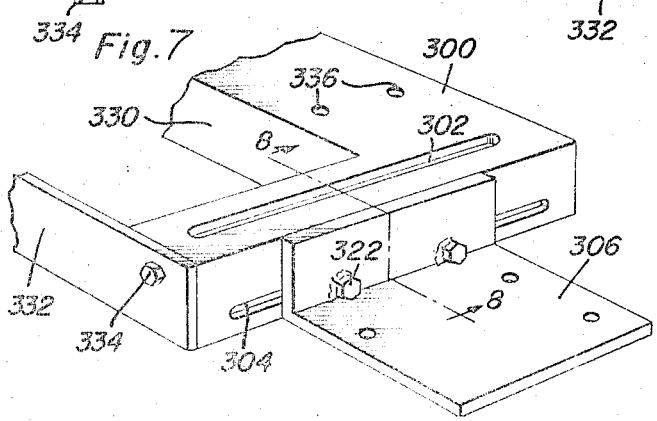

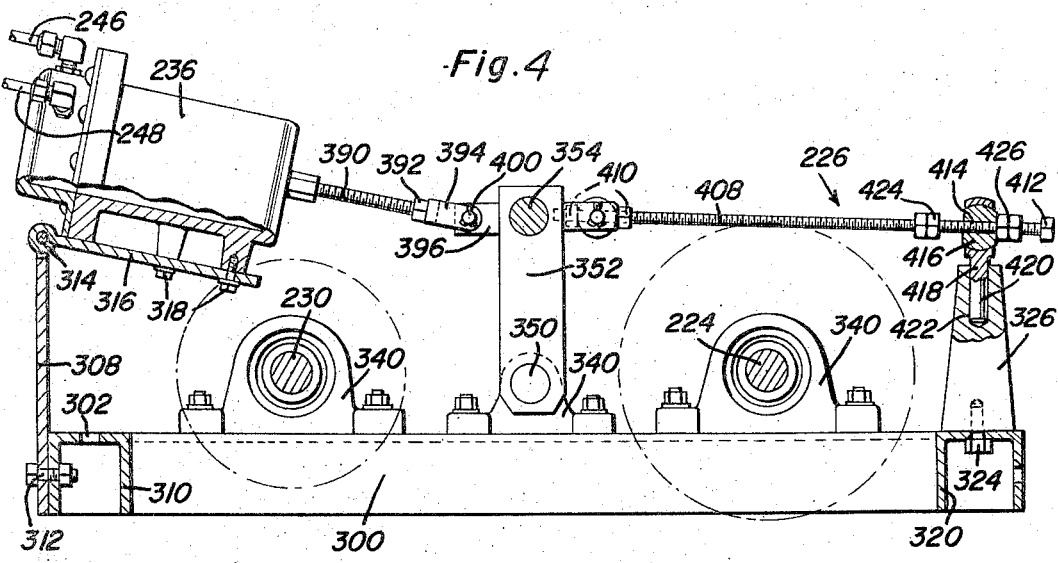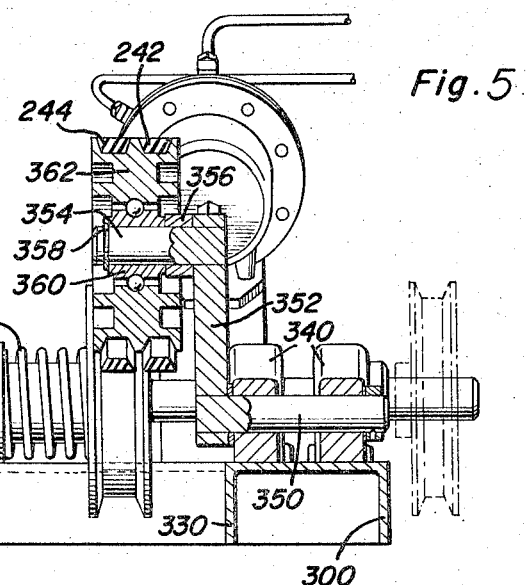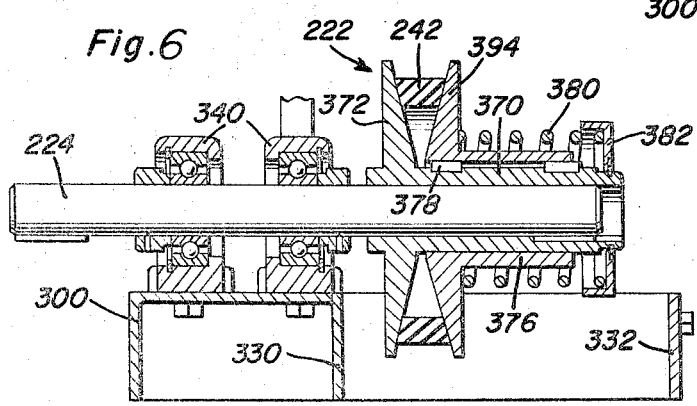

United States Patent Office 3,301,077
Patented Jan. 31, 1967

3,301,077
VARIABLE SPEED TRANSMISSION UNIT
Dan Caughlin, Calexico, Calif., assignor to Texonia Industries, Inc., Calexico, Calif., a corporation of California
Filed Mar. 16, 1964, Ser. No. 352,208
4 Claims. (Cl. 74—230.17)

This application contains subject matter disclosed in my prior co-pending application Serial No. 36,220, filed June 15, 1960 for Cotton Precompressor, now Patent No. 3,239,889, and includes additional subject matter and improvements thereover and constitutes a continuation-in-part of said application.

This invention comprises a variable speed transmission unit.

An object of the invention is to provide a variable speed transmission device applicable for general use in the obtaining of very small speed variations between a driving and a driven shaft.

These together with other objects and advantages which will become subsequently apparent reside in the details of construction and operation as more fully hereinafter described and claimed, reference being had to the accompanying drawings forming part hereof, wherein like numerals refer to like parts throughout, and in which:

FIGURE 2 is a view in side elevation showing the variable speed transmission mechanism;

FIGURE 3 is a top plan view of the transmission device of FIGURE 2;

FIGURE 4 is a vertical longitudinal sectional view of the transmission mechanism being taken substantially upon a plane indicated by section line 4—4 of FIGURE 3 and with parts being broken away and shown in vertical section;

FIGURE 5 is a vertical transverse sectional detail view taken substantially upon the plane indicated by section line 5—5 of FIGURE 2;

FIGURE 6 is a vertical sectional detail view taken substantially upon the plane indicated by section line 6—6 of FIGURE 2 and showing particularly the construction of a variable diameter driving pulley forming a portion of the variable speed transmission unit;

FIGURE 7 is a fragmentary detail view in perspective of a portion of the supporting base or frame of the transmission unit;

FIGURE 8 is a further detail view in vertical longitudinal section being taken substantially upon a plane indicated by the section line 8—8 of FIGURE 7.

Figure 1:
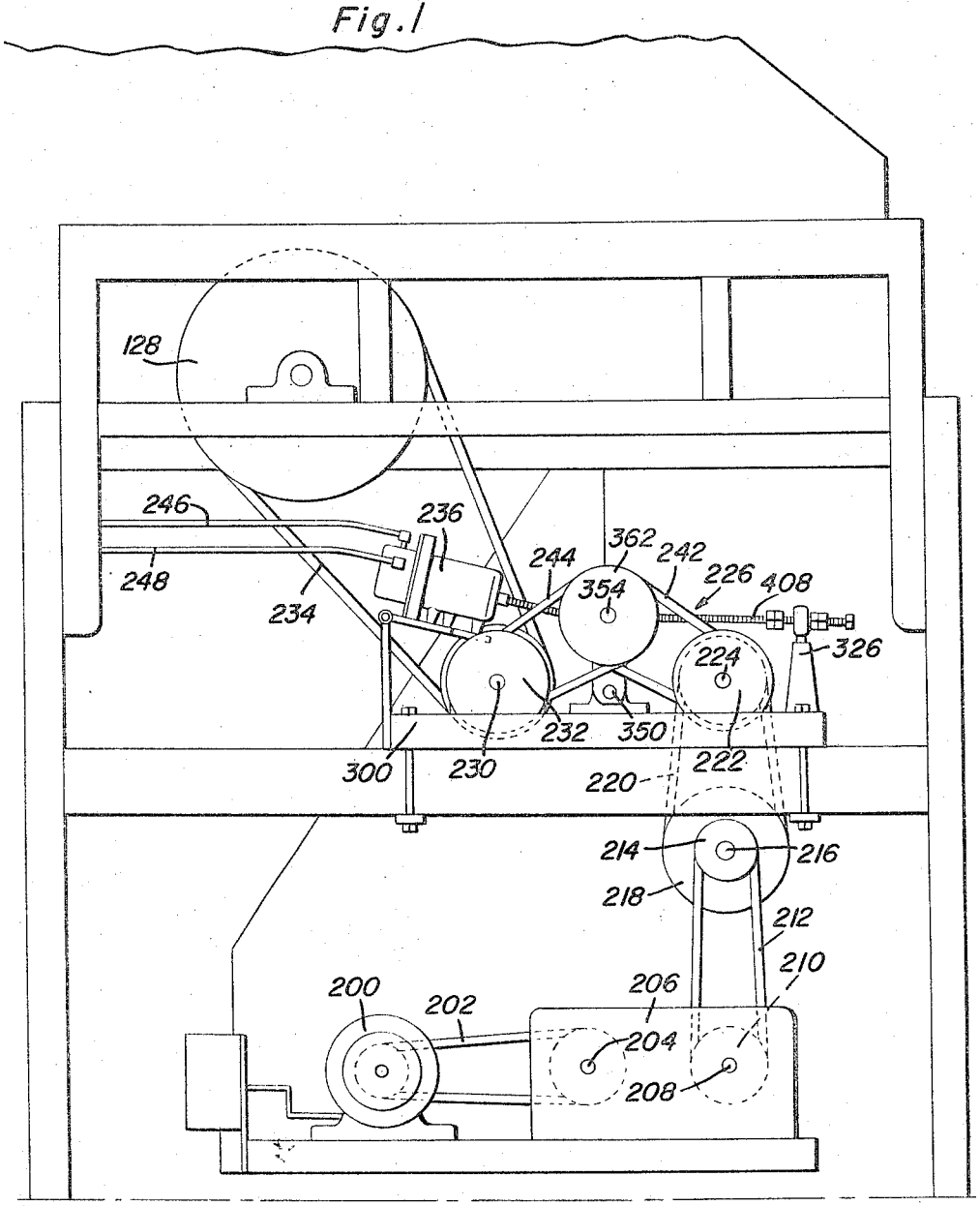
FIGURE 1 is a diagrammatic view in side elevation showing some of the drive and the drive control means for a work load including the association therewith of an adjustable variable speed transmission assembly unit for adjustably regulating the speed of the work load.

This invention envisions a variable speed transmission which is useful for the general purposes of a variable speed transmission for delivering power from a driving member to a driven member.

Referring now particularly to FIGURE 1, it will be observed that an electric motor 200 is connected by a belt 202 with the power input shaft 204 of a speed varying transmission assembly 206 having a power output shaft 208. The variable transmission 206 may be of any desired character which will enable different speed ratios to be provided for the input and output shaft 204 and 208 respectively. A pulley 210 on the output shaft 208 is connected by a belt 212 with a pulley 214 on the shaft 216. A further pulley 218 on the shaft 216 is connected by a belt 220 with a pulley 222 on a shaft 224. The latter shaft comprises the power input shaft of a second variation speed transmission mechanism indicated generally by the numeral 226. The power output shaft 230 of this transmission is provided with a pulley 232 connected by a belt 234 with a drive pulley 128 which is connected to a work load. The details of the variable speed transmission 226 will be set forth hereinafter, and variable ratios may be established between the input shaft 224 and the output shaft 230 and thus the pulley 128. Power operated means are provided for effecting this change in speed ratio.

Thus, referring now also to FIGURES 4-8, a fluid pressure motor such as an air motor 236 is operatively connected to the shaft 354 of a double pulley 362 connected by belts 242 and 244 respectively to the input and output shaft pulley 222 and 232 respectively. A pair of fluid conduits 246 and 248 connect the fluid motor to a source of fluid pressure, not shown.

It is intended that in some instances the source of power 200 may be directly coupled to the transmission mechanism 226 as at the input shaft 224 with the transmission assembly 206 being omitted. Further, the transmissions 206 and 226 may be operated and adjusted independently of each other or jointly and interdependently.

The variable speed transmission unit 226 includes a suitable mounting base 300 of a plate-like configuration having transversely extending slots 302 at its opposite ends upon its horizontal top surface, FIGURE 3, and further transverse slots 304 upon its vertical end surfaces for the reception of adjustable L-shaped fastening brackets 306, FIGURE 7. In this manner, the base may be conveniently supported in connection with the structure and framework of the apparatus with which it is to be used.

As shown in FIGURES 2 and 4, rising from one end of the base 300 is a vertically extending mounting plate 308 secured to the base channel-shaped end member 310 as by fastening bolts 312. A hinge 314 at the upper end of the mounting plate 308 secures a pivoted support plate 316 to which is detachably secured as by fastening bolts 318 the previously mentioned fluid pressure motor 236, the arrangement being such that the motor and its support plate 316 may be tiltable vertically about the hinge 314 in order to properly align with its associated mechanism as set forth hereinafter.

At the end remote from the motor, the channel-shaped end member of the base as shown at 320 has secured to its vertical surface by the fastening bolts 322 the previously mentioned mounting bracket 306. In addition, rising from the end member of the base and detachably secured thereto as by fastening bolts 324 is a standard 326 which is adjustable transversely of the base 300 by positioning the bolts 324 in the transverse slot 302 previously mentioned. As will be apparent from FIGURE 3, the base includes a cutaway portion or opening 330 which is closed by the movable end wall 332 secured as by fastening bolts 334. The solid portion of the base 302 is provided with suitable sets of apertures as at 336 therein for the reception of corresponding fastening bolts as at 338 by which bearing blocks or pillar blocks 340 are mounted.

It will be observed that one pair of the pillar blocks 340 journals the previously mentioned power input shaft 224 of the transmission assembly while another pair of the pillar blocks 340 journals the power output shaft 230. The middle pair of pillar blocks 340 pivotally supports an axle or pivot pin 350 upon which is mounted an upstanding standard or support 352 having fixedly secured thereto at its upper end a laterally projecting stub axle 354.

Referring next particularly to FIGURE 5 it will be observed that removably secured upon the stub axle 354 between a spacer collar 356 and a retaining ring 358 is a ball bearing assembly 360 upon which there is journalled a double pulley 362. One groove of the double pulley is connected by the belt 242 to the power input shaft pulley 222, while the other groove is connected by the other belt 244 to the power output shaft pulley 232. It will be observed that the pivotal mounting of the stub axle 354 and standard 352 upon the pivot pin 350 permits a relative pivoting or tilting movement of the double pulley between the power input and the power output shafts for a purpose which will become subsequently apparent.

Referring now more particularly to FIGURES 3, 5 and 6 it will be observed that the double pulley 362 comprises an idler or intermediate pulley disposed over the opening 330. The input and output pulleys are positioned within the opening 330.

The power input and output shaft 224 and 230 are of a particular construction. Inasmuch as these constructions are identical, a description of the power input shaft and its construction and that of the associated elements will suffice for an understanding of both. The power input shaft 224 is journalled in the two bearing assemblies 340, previously mentioned, in any suitable manner, such as that shown in FIGURE 6, with an end portion of the shaft extending over the opening 330 in the base. Secured to this extended portion of the shaft is a variable diameter driving pulley previously indicated by the numeral 222. This pulley includes an elongated cylindrical hub 370 having one pulley flange 372 rigidly or integrally formed thereon. Cooperating with the flange 372 is a movable complementary pulley flange 394 likewise having a cylindrical hub 376 which is slidably journalled upon the hub 370, being keyed or splined thereon as at 378 to permit axial movement but prevent relative rotary movement therebetween. A compression spring 380 encircles the hub 376 and bears against a spring retainer 382 suitably secured to the pulley hub 370. The arrangement is such that the spring urges the two pulley sections towards each other or in a direction to narrow the width between the beveled surfaces of the pulley section and thus increase the effective diameter of the pulley. The previously mentioned belt 242 is entrained over this pulley and over one of the grooves of the double pulley 362 previously mentioned. In a similar manner, a belt 244 is disposed over the other groove of the double pulley and over the corresponding variable diameter pulley 232 of the power output shaft. As so far described, it will now be apparent that when the link, lever or standard 352 is pivoted towards the power input shaft, the belt 242 will be slackened. This will permit the spring 380 to urge the pulley section 374 toward the section 372 thereby increasing the effective diameter of the pulley 222 to take up the slack thus introduced into the belt 242. At the same time, the tilting movement of the standard 352 will further tension the belt 244. This will result in increased pressure of the belt forcing the latter downwardly into the pulley sections of the variable diameter pulley 232 of the power output shaft thereby spreading the sections apart against resistance of their spring 380 and thereby decreasing the effective diameter of this pulley. Consequently, the ratio between the driving and driven pulleys will be varied, the speed ratio being thus increased. A reverse movement of the tiltable or pivotal lever 352 will reversely affect the speed ratio causing this ratio to decrease. In accordance with this invention positive means are provided for effecting by the fluid pressure actuated motor 236 the tilting of the standard 352 and thus the varying of the diameters of the two pulleys and the corresponding change of the speed ratio of the system.

The fluid pressure operating motor 236 is preferably of the piston cylinder or diaphragm cylinder type, in which either this piston or diaphragm, not shown, is connected to a piston rod having an externally threaded portion as at 390. This is adjustably secured by a lock nut 392 to a clevis 394 which latter is secured to an arm 396 projecting from and secured to a collar or sleeve 398 disposed upon the stub axle 354, a clevis pin 400 being provided for this purpose. An oppositely extending arm 402 has a cylindrical body 404 pivotally secured thereto and is provided with a diametrical bore 406 therethrough within which is received the externally threaded end portion of an adjusting rod 408. A pair of nuts as at 410 are disposed on threaded portions of the rod 408 on opposite sides of the body 404 for adjustably locking the end of the rod 408 thereto. At its other end, the rod is provided with a headed portion 412 and as shown in FIGURE 4, the rod is loosely slidably received in a bore 414 formed in a socket member 416 swivelly carried by a standard 418 whose stem 420 is received in a vertical seat 422 formed in the upper end of the standard 326. Pairs of adjusting nuts 424 and 426 are adjustably positioned upon the adjusting rod 408 on opposite sides of the socket member 416 to adjustably limit the range of sliding movement of the rod through the socket member 416. This adjusting means serves the dual functions of limiting the range of movement which can be imparted to the pivoted or tiltable lever 352 by the fluid motor 236 and also enables manual operation of the rod 408 to be effected which will manually adjust the speed varying mechanism just described.

As so far described it will now be evident that when a fluid pressure impulse is imparted by the conduit 246 or 248 to the fluid motor 236, the latter will effect a rocking or tilting or pivoting of the lever 352 which in turn will oppositely adjust the effective diameters of the input and output shaft pulleys thereby varying the speed ratio therebetween. Consequently, for a given speed applied to the input shaft and to the belt 220, a wide and precise range of adjustment by infinitesimal amounts can be obtained of the speed of the output shaft and thus of the lint condenser cylinder with respect to the speed of the input shaft. It will be noted that this adjustment is made automatically by the fluid motor 236 under the control of any suitable detector means or can be made by manual adjustment by manipulation of the adjustment rod 408 as previously mentioned. In addition to this adjustment of the speed ratio between the power input and power output shafts of the variable speed transmission, additional speed range adjustment can be made by properly manipulating the transmission unit 206.

The foregoing is considered as illustratve only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention as claimed.

What is claimed as new is as follows:

1. A variable speed transmission comprising a base, an input pulley, an output pulley, an idler shaft, means pivotally supporting the idler pulley on the base, an input idler pulley mounted on the idler shaft, an output idler pulley mounted on the idler shaft, an input belt wound around the input pulley and the input idler pulley, an output belt wound around the output pulley and the output idler pulley, the idler shaft being pivotally movable to alternately increase and decrease the tension of the belts, and means to automatically vary the diameter of one of the pulleys about which the input belt is wound in response to variations in tension of the input belt upon movement of the idler shaft.

2. The variable speed transmission of claim 1 wherein the variable diameter pulley has an axially movable side which moves to achieve the diameter variation, and means biasing the movable side in a direction to increase the diameter of the pulley.

3. The variable speed transmission of claim 1 including means to automatically vary the diameter of one of the pulleys about which the output belt is wound in response to variations in tension of the output belt upon movement of the idler shaft.

4. The variable speed transmission of claim 3 wherein the variable diameter pulleys are the input and output pulleys.

References Cited by the Examiner

UNITED STATES PATENTS

| | | | |
|---|---|---|---|
| 2,581,683 | 1/1952 | McEwan | 74—230.17 |
| 2,689,484 | 9/1954 | Phares | 74—230.17 |
| 2,727,398 | 12/1955 | Bowen | 74—230.17 |
| 2,834,058 | 5/1958 | Bryant | 19—66 |
| 2,914,809 | 12/1959 | Buzik | 19—66 |
| 2,942,447 | 6/1960 | Rickel et al. | 74—230.17 |
| 3,108,332 | 10/1963 | Moss et al. | 19—202 |

DAVID J. WILLIAMOWSKY, *Primary Examiner.*

DONALD W. PARKER, *Examiner.*

L. H. GERIN, *Assistant Examiner.*